(12) United States Patent
Patel et al.

(10) Patent No.: US 7,475,241 B2
(45) Date of Patent: Jan. 6, 2009

(54) METHODS AND APPARATUS FOR DYNAMIC SESSION KEY GENERATION AND REKEYING IN MOBILE IP

(75) Inventors: Alpesh Patel, Santa Clara, CA (US); Kent K. Leung, Los Altos, CA (US); Stefan Raab, South Riding, VA (US); Gopal Dommety, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 853 days.

(21) Appl. No.: 10/635,882

(22) Filed: Aug. 5, 2003

(65) Prior Publication Data
US 2005/0025091 A1 Feb. 3, 2005

Related U.S. Application Data

(60) Provisional application No. 60/428,440, filed on Nov. 22, 2002.

(51) Int. Cl.
*H04L 9/00* (2006.01)
(52) U.S. Cl. ............................................ 713/155; 726/5
(58) Field of Classification Search ..................... None
See application file for complete search history.

(56) References Cited

U.S. PATENT DOCUMENTS 4,692,918 A 9/1987 Elliott et al.

(Continued)

FOREIGN PATENT DOCUMENTS

EP 1 139 634 10/2001

OTHER PUBLICATIONS

C. Perkins, *Mobile IP and Security Issue: An Overview*, Nokia, U.S., Oct. 25, 1999, pp. 131-148, XP010514313.

(Continued)

*Primary Examiner*—Nasser G Moazzami
*Assistant Examiner*—Brandon S Hoffman
(74) *Attorney, Agent, or Firm*—Weaver Austin Villeneuve & Sampson LLP

(57) ABSTRACT

Methods and apparatus for providing a centralized source of session keys to be shared by a Home Agent and a Mobile Node are disclosed. In accordance with one aspect of the invention, a Mobile Node registers with a Home Agent supporting Mobile IP by sending a registration request to the Home Agent. The Home Agent sends a request message (e.g., access-request message) to a AAA server, the request message identifying the Mobile Node. The AAA server then derives key information from a key or password associated with the Mobile Node. The AAA server then sends a reply message (e.g., access-reply message) to the Home Agent, the reply message including the key information associated with the Mobile Node, thereby enabling the Home Agent to derive a shared key to be shared between the Mobile Node and the Home Agent from the key information. The Home Agent derives a key from the key information, the key being a shared key between the Mobile Node and the Home Agent. A registration reply is then sent to the Mobile Node. When the Mobile Node receives a registration reply from the Home Agent, the registration reply indicates that the Mobile Node is to derive a key to be shared between the Mobile Node and the Home Agent. The Mobile Node then derives a key to be shared between the Mobile Node and the Home Agent from key information stored at the Mobile Node. The Mobile Node may initiate "re-keying" by sending a subsequent registration request to the Home Agent.

53 Claims, 11 Drawing Sheets

U.S. PATENT DOCUMENTS

| | | | |
|---|---|---|---|
| 5,016,244 | A | 5/1991 | Massey et al. |
| 5,018,133 | A | 5/1991 | Tsukakoshi et al. |
| 5,218,600 | A | 6/1993 | Schenkyr et al. |
| 5,371,852 | A | 12/1994 | Attanasio et al. |
| 5,473,599 | A | 12/1995 | Li et al. |
| 5,793,762 | A | 8/1998 | Penners et al. |
| 6,119,160 | A | 9/2000 | Zhang et al. |
| 6,148,074 | A | 11/2000 | Miloslavsky et al. |
| 6,148,405 | A | 11/2000 | Liao et al. |
| 6,339,830 | B1 | 1/2002 | See et al. |
| 6,377,982 | B1 | 4/2002 | Rai et al. |
| 6,487,605 | B1 | 11/2002 | Leung |
| 6,535,493 | B1 | 3/2003 | Lee et al. |
| 6,560,217 | B1 | 5/2003 | Pierce, Jr. et al. |
| 6,728,536 | B1 | 4/2004 | Basilier et al. |
| 6,760,444 | B1 | 7/2004 | Leung |
| 6,785,823 | B1 * | 8/2004 | Abrol et al. .......... 726/7 |
| 6,795,857 | B1 | 9/2004 | Leung et al. |
| 6,907,016 | B2 | 6/2005 | Madour et al. |
| 6,947,725 | B2 | 9/2005 | Aura |
| 6,956,846 | B2 | 10/2005 | Lewis et al. |
| 7,003,282 | B1 | 2/2006 | Ekberg |
| 7,042,879 | B2 | 5/2006 | Eschbach et al. |
| 7,065,067 | B2 | 6/2006 | Song et al. |
| 7,073,066 | B1 | 7/2006 | Nessett |
| 7,107,051 | B1 | 9/2006 | Walker |
| 7,107,620 | B2 | 9/2006 | Haverinen et al. |
| 7,158,777 | B2 | 1/2007 | Lee et al. |
| 7,168,090 | B2 | 1/2007 | Leung |
| 7,181,196 | B2 | 2/2007 | Patel |
| 7,224,673 | B1 | 5/2007 | Leung et al. |
| 7,286,520 | B2 | 10/2007 | Takeda et al. |
| 7,298,847 | B2 | 11/2007 | Jing et al. |
| 7,320,070 | B2 | 1/2008 | Baum |
| 2002/0120844 | A1 | 8/2002 | Faccin et al. |
| 2002/0147820 | A1 * | 10/2002 | Yokote .......... 709/229 |
| 2003/0005280 | A1 | 1/2003 | Bobde et al. |
| 2003/0028763 | A1 * | 2/2003 | Malinen et al. .......... 713/155 |
| 2003/0115468 | A1 | 6/2003 | Aull et al. |
| 2004/0103282 | A1 | 5/2004 | Meier et al. |
| 2004/0114558 | A1 | 6/2004 | Krishnamurthi et al. |
| 2004/0162105 | A1 | 8/2004 | Reddy et al. |
| 2004/0234075 | A1 | 11/2004 | Leung |
| 2005/0010780 | A1 | 1/2005 | Kane et al. |
| 2005/0083905 | A1 | 4/2005 | Nishida et al. |
| 2005/0102522 | A1 | 5/2005 | Kanda |
| 2005/0135622 | A1 | 6/2005 | Fors et al. |
| 2005/0135624 | A1 | 6/2005 | Tsai et al. |
| 2005/0138355 | A1 | 6/2005 | Chen et al. |
| 2005/0177515 | A1 | 8/2005 | Kalavade et al. |
| 2005/0177723 | A1 | 8/2005 | Huang et al. |
| 2006/0046693 | A1 | 3/2006 | Tran et al. |
| 2006/0072759 | A1 | 4/2006 | Gundavelli et al. |
| 2006/0104247 | A1 | 5/2006 | Dommety et al. |
| 2007/0091843 | A1 | 4/2007 | Patel et al. |
| 2007/0124592 | A1 | 5/2007 | Oyama |
| 2007/0230453 | A1 | 10/2007 | Giaretta et al. |
| 2007/0274266 | A1 | 11/2007 | Oyama |

OTHER PUBLICATIONS

K. Sufatrio, et al., *Mobile IP Registration Protocol: A Security Attack and New Secure Minimal Public-Key Based Authentication*, Parallel Architectures, Algorithms, and Networks, 1999 (I-Span '99) proceedings. Fourth International Symposium, Perth/Fremantle, Australia, Jun. 23-25, 1999, Los Alamitos, California, IEEE pp. 364-369, XP010341845.

S. Jacobs, *Security Of Current Mobile IP Solutions*, MILCOM 97 Proceedings, Monterey, California, Nov. 2-5, 1997, IEEE pp. 1122-1128, XP010260752.

S. Jacobs, *Mobile IP Public Key Based Authentication*, internet draft, Aug. 1, 1998, pp. 1-27, XP002285008.

Release notes for 3Com Corporation, "Conducting a Redundant Route for Network Resiliency," Mar. 1994, *NET Builder Family Bridge/Router* pp. 26-29.

J. Moy, RFC 1247 "OSPF Version 2," Jul. 19, 1991.

D. Oran, RFC 1142 "OSI IS-IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

C. Perkins, "IP Mobility Support," RFC 2002, IBM Corporation, Oct. 1996.

"Mobile IP," Release 12.0(1)T, pp. 1-55.

Montenegro, G., RFC 2344, "Reverse Tunneling for Mobile IP," Sun Microsystems, Inc., May 1998.

D. Harkins and D. Carrel, "The Internet Key Exchange (IKE)," Cisco Systems, Jun. 1998.

D. Cong and M. Hamlen, and C. Perkins, RFC 2006, "The Definitions of Managed Objects for IP Mobility Support using SMIv2," Motorola and IBM, Oct. 1996.

D. Carrel and Lol Grant, Internet Draft, "The TACACS+Protocol," Jan. 1997.

C. Rigney, RFC 2139 "RADIUS Accounting," Livingston, Apr. 1997.

C. Rigney, et al., RFC 2138, "Remote Authentication Dial in User Service (RADIUS)," Apr. 1997.

J. Kohl, et al., RFC 1510, "The Kerberos Network Authentication Service (V5)" Sep. 1993.

C. Perkins, Ed., RFC 3220, "IP Mobility Support for IPv4" Jan. 2002.

C. Finseth, RFC 1492, "An Access Control Protocol, Sometimes Called TACACS," Jul. 1993.

C. Perkins, et al., Internet Draft, "AAA Registration Keys for Mobile IP," http://www.ietf.org/proceedings/00jul/I-D/mobileip-aaa-key-01.txt, Jan. 28, 2000.

C. Perkins, Ed. RFC 3344, "IP Mobility Support for IPv4," Aug. 2002.

G. Zorn, RFC 2759, "Microsoft PPP CHAP Extensions, Version 2," Jan. 2000.

G. Dommety, et al. RFC 3115, "Mobile IP Vendor/Organization-Specific Extensions," Apr. 2001.

G. Zorn, RFC 2548, "Microsoft Vendor-specific RADIUS Attributes," Mar. 1999.

C. Perkins, et al., RFC 3012, "Mobile IPv4 Challenge/Response Extensions," Nov. 2000.

C. Perkins, et al., Internet Draft, "AAA Registration Keys for MobileIP," draft-ietf-mobileip-aaa-key-13.txt, Jun. 22, 2003.

C. Perkins, et al., Internet Draft, "AAA Registration Keys for Mobile IP," draft-ietf-mobileip-aaa-key-10.txt, Oct. 23, 2002.

S. Jacobs, et al., Internet Draft, "Mobile IP Public Key Based Authentication," draft-jacobs-mobileip-pki-auth-03.txt, Jul. 9, 2001.

K. Leung, et al., U.S. Appl. No. 10/328,522, "Methods and Apparatus for Authenticating Mobility Entities Using Kerberos," filed Dec. 24, 2002.

S. Gundavelli, et al., U.S. Appl. No. 10/951,499, "Methods and Apparatus for Bootstrapping Mobile-Foreign and Foreign-Home Authentication Keys In Mobile IP," filed Sep. 27, 2004.

G. Dommety, et al. U.S. Appl. No. 10/992,435, "Infrastructure-less Bootstrapping: Trustless Bootstrapping To Enable Mobility For Mobile Devices," filed Nov. 17, 2004.

Examiner's Communication pursuant to Article 96(2) EPC dated Sep. 6, 2006, from corresponding European Patent Application No. 03 789 813.7 5 pages.

U.S. Office Action mailed Jul. 26, 2006 from related U.S. Appl. No. 10/328,522.

U.S. Office Action mailed Jan. 11, 2007 from U.S. Appl. No. 10/328,522.

Rigney et al., "Remote Authentication Dial In User Serivice (RADIUS)", RFC 2865, Jun. 2000 (76 pgs).

Aboba et al., "The Network Access Identifier", RFC 2486, Jan. 1999 ( pgs.).

Calhoun et al., "Mobile IP Network Access Identifier Extension for IPv4", RFC 2794, Mar. 2000 (9 pgs.).

D. Eastlake "DNS Security Operational Considerations", RFC 2541, Mar. 1999 (7 pgs).

Johnson et al., "Mobility Support in IPv6", RFC 3775, Jun. 2004 (165 pgs.).

International Search Report dated Jun. 29, 2004 from the related International Application No. PCT/US03/36850.

U.S. Office Action mailed Jul. 3, 2007 from U.S. Application No. 10/328,522.

International Search Report and Written Opinion dated May 21, 2007 from corresponding International Application No. PCT/US06/41511.

Calhoun et al., "Diameter Base Protocol," RFC 3588, Sep. 2003 (133 pgs.).

C. Perkins et al., "Authentication, Authorization, and Accounting (AAA) Registration Keys for Mobile IPv4," RFC 3957, Mar. 2005, (27 pgs.).

Haverinen et al., Extensible Authentication Protocol Method for GSM Subscriber Identity Modules (EAPSIM), Internet Draft, Dec. 21, 2004, 85 pgs.

U.S. Office Action dated Dec. 21, 2007 from related U.S. Appl. No. 10/328,522, 15 pages.

U.S. Office Action dated Mar. 3, 2008 from related U.S. Appl. No. 11/258,720, 14 pages.

U.S. Office Action dated Mar. 17, 2008 from related U.S. Appl. No. 10/992,435, 15 pages.

* cited by examiner

METHODS AND APPARATUS FOR DYNAMIC SESSION KEY GENERATION AND REKEYING IN MOBILE IP

RELATED APPLICATIONS

This application claims priority from Provisional Patent Application No. 60/428,440, entitled "Methods and Apparatus for Dynamic Session Key Generation and Rekeying in Mobile IP," by inventors Patel et al, filed on Nov. 22, 2002, which is incorporated herein by reference for all purposes.

BACKGROUND OF THE INVENTION

1. Field of the Invention

The present invention relates to Mobile IP network technology. More particularly, the present invention relates to performing dynamic session key generation in Mobile IP.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4. Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

During registration of a mobile node with its Home Agent, the identities of the sending party of the registration request (e.g., mobile node) and the sending party of the registration reply (e.g., Home Agent) are authenticated. During the registration process, a Mobile-Home Authentication Extension is typically appended to both the registration request and the registration reply. Upon receipt of the registration request by the Home Agent and the registration reply by the mobile node, the identity of the sending party is authenticated through the application of the Mobile-Home Authentication Extension.

RFC 3344 specifies the packet format for both the registration request and the registration reply packets that are sent between the mobile node and the Home Agent. As shown in FIG. 2, a registration request packet 202 and registration reply packet 204 both include a mandatory Mobile-Home Authentication Extension (MHAE) 206. More specifically, the mandatory Mobile-Home Authentication Extension 206 includes a type field 208, a length field 210, a security parameter index (SPI) field 212, and an authenticator 214. The type field 208 indicates the type of the extension (i.e., Mobile-Home Authentication Extension) and the length field 210 indicates the length of the extension (e.g., bytes). The Security Parameter Index 212 is an identifier which specifies a security association, or "row" in a security-association table, that a receiver should use to interpret a received packet. The security-association, described in further detail below, defines the key and the algorithm to be applied during the authentication process. Both the registration request packet 202 and the registration reply packet 204 include a protected area 216 which includes the registration request 202/registration reply 204, the type field 208, the length field 210, and the security parameter index (SPI) field 212. Both the Mobile Node and the Home Agent are typically configured with the same secret key, provided by the security-association, which is used to hash this protected area 216 to create the authenticator 214.

FIG. 3 is a process flow diagram illustrating the process steps performed during authentication of a Mobile Node. As shown, the process begins at step 302 and at step 304, the Mobile Node constructs a registration request including a protected area. At step 306, the Mobile Node generates an authenticator by hashing the protected area with the key through application of a specified algorithm. The mobile node then sends the registration request which includes the protected area and the authenticator to the Home Agent at step 308. The Home Agent then identifies all necessary information such as the key and the algorithm used to generate its authenticator from a security-association, corresponding to the SPI of the registration request, at step 310. Next, at step 312, the Home Agent generates its authenticator by hashing the protected area of the registration request with the key using the algorithm identified by the SPI. The Home Agent then compares the authenticator generated by the mobile node with the authenticator generated by the Home Agent. If it is determined at step 314 that the authenticators match, the mobile node is authenticated at step 316 and the process is completed at step 318. However, if the authenticators do not match, the Mobile Node is not authenticated at step 320 and the process is completed at step 322. Authentication may similarly be performed by the Mobile Node upon receipt of the registration reply that is sent by the Home Agent. However, a different SPI and therefore security-association may be applied during authentication of the Home Agent.

As described with respect to the authentication process, a Security Association provides information that is used to generate the authenticators during the authentication process. FIG. 4 is a diagram illustrating a conventional security association table that is typically configured on each Home Agent. As shown, a security association table 402 typically includes at least one entry 404 for each mobile node supported by that Home Agent. By way of example, multiple security associations may be applicable to different types of data transfers which have different security requirements. Each entry 404 may include a mobile node identifier 406 for the mobile node such as the IP address of the mobile node and an SPI 408 identifying the security association within the security-association table. In addition, an authentication key 410 (e.g., a secret key) that is shared between the Mobile Node and the Home Agent is provided (e.g., keyed MD5). An algorithm 412 used to create the authenticator is provided (e.g., RSA Message Digest Algorithm MD5). Moreover, a mode 414 such as prefix, suffix, or prefix-suffix indicates the mode used during authentication. This mode indicates the portions of the protected region that are hashed with the key. In addition, each entry 404 further includes a replay timer 416, or timestamp, that indicates a maximum time during which the registration request may be replayed. The replay timer protects against unauthorized copying and "replaying" of registration requests for the purpose of defeating authentication.

Even though the replay timer can reduce the risk of replaying a registration request, there exists a risk of compromising statically configured keys. Specifically, when a shared key is statically configured at the Home Agent and the Mobile Node, the shared key is repeatedly re-used. As a result, there is a possibility that a statically configured key may be discovered over numerous communications. The encrypted information that may be decrypted via this shared key is therefore also compromised.

Security-association tables may potentially include many thousands of entries and therefore consume a substantial amount of memory. As described above, at least one entry is typically provided in such security-association tables for each Mobile Node supported by the corresponding Home Agent. Moreover, these security-association tables are typically stored in non-volatile memory to prevent destruction of this information. This does not pose a problem when the Home Agent is a workstation having very large hard disks or other forms of non-volatile memory. However, when a network device such as a router or switch serves as the Home Agent, memory, particularly non-volatile memory, is a premium resource. Although the use of non-volatile memory ensures that security-associations will not be irretrievably lost, non-volatile RAM in a typical router is limited. By way of example, the non-volatile RAM may be approximately 128 kilobytes in a typical router. Since each security association consumes approximately 80 bytes of memory, the number of security associations that may be stored on a Home Agent is limited to about 1500. Actually, a portion of the router's NVRAM must be set aside for other purposes, so the actual number of security associations that it can store will be significantly less than the theoretical maximum. In short, the physical limitation in memory makes it impossible to store the security-associations for all mobile nodes that could otherwise be supported by a Home Agent.

In addition, the security-association tables are typically manually configured for each Home Agent. FIG. 5 is a block diagram illustrating a mobile IP network segment and associated environment. Mobile IP environment 502 includes the internet (or a WAN) 504 over which various mobile nodes can communicate remotely via mediation by a corresponding Home Agent (via an appropriately configured router denoted R1). An entity such as a corporation, business, or government may provide multiple Home Agents. Here, a first Home Agent 506, a second Home Agent 508, a third Home Agent 510, a fourth Home Agent 512, and a fifth Home Agent 514 are shown. As shown, such an environment lacks a centralized source of security associations. Therefore, each Home Agent must be separately configured for Mobile Nodes supported by that Home Agent. Moreover, redundant Home Agents may be provided to permit a Home Agent to serve as a backup to protect against failure by a primary Home Agent. By way of example, the fourth Home Agent 512 and the fifth Home Agent 514 may store identical security-associations in the event that one of the Home Agents fails. Thus, when a security-association is updated (e.g., a key is modified) the security-association must be updated on all of the redundant Home Agents. Accordingly, such a system requires considerable administrative overhead.

In view of the above, it would be desirable if a centralized source of shared keys could be implemented. Moreover, it would be beneficial if the risk of discovering shared keys could be reduced or eliminated.

SUMMARY OF THE INVENTION

Methods and apparatus for providing a centralized source of session keys to be shared by a Home Agent and a Mobile Node are disclosed. This is accomplished, in part, through the use of a AAA server used to provide relevant key information to the Home Agent. In this manner, the Mobile Node and its Home Agent may separately derive the shared key, eliminating the need to transmit the shared key and the risk of its decryption.

In accordance with one aspect of the invention, a Mobile Node registers with a Home Agent supporting Mobile IP by sending a registration request to the Home Agent. When the Mobile Node receives a registration reply from the Home Agent, the registration reply indicates that the Mobile Node is to derive a key to be shared between the Mobile Node and the Home Agent. The Mobile Node then derives a key to be shared between the Mobile Node and the Home Agent from key information stored at the Mobile Node.

In accordance with another aspect of the invention, a server adapted for authentication, authorization, and accounting (AAA) receives a request message (e.g., access-request message) from a Home Agent, the request message identifying the Mobile Node. The AAA server then derives key information from a key or password associated with the Mobile Node. The key or password may obtained from another server, such as a Microsoft Windows™ domain controller. The AAA server then sends a reply message to the Home Agent, the reply message including the key information associated with the Mobile Node, thereby enabling the Home Agent to derive a shared key to be shared between the Mobile Node and the Home Agent from the key information.

In accordance yet another aspect of the invention, a Home Agent receives a registration request from a Mobile Node, the registration request identifying the Mobile Node. The Home Agent sends a request message (e.g., access-request message) to a AAA server, the request message identifying the Mobile Node. The Home Agent receives a reply message (e.g., access-reply message) from the AAA server, the reply message including key information associated with the Mobile Node. The Home Agent derives a key from the key information, the key being a shared key between the Mobile Node and the Home Agent. A registration reply is then sent to the Mobile Node.

In accordance with yet another aspect of the invention, the Mobile Node may initiate re-keying by sending a subsequent registration request to the Home Agent. The Home Agent and the Mobile Node may then derive a key from the previously used session key. Keys can be generated each time a binding is cleared, such as upon expiration of the Mobile Node's lifetime or de-registration of the Mobile Node.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
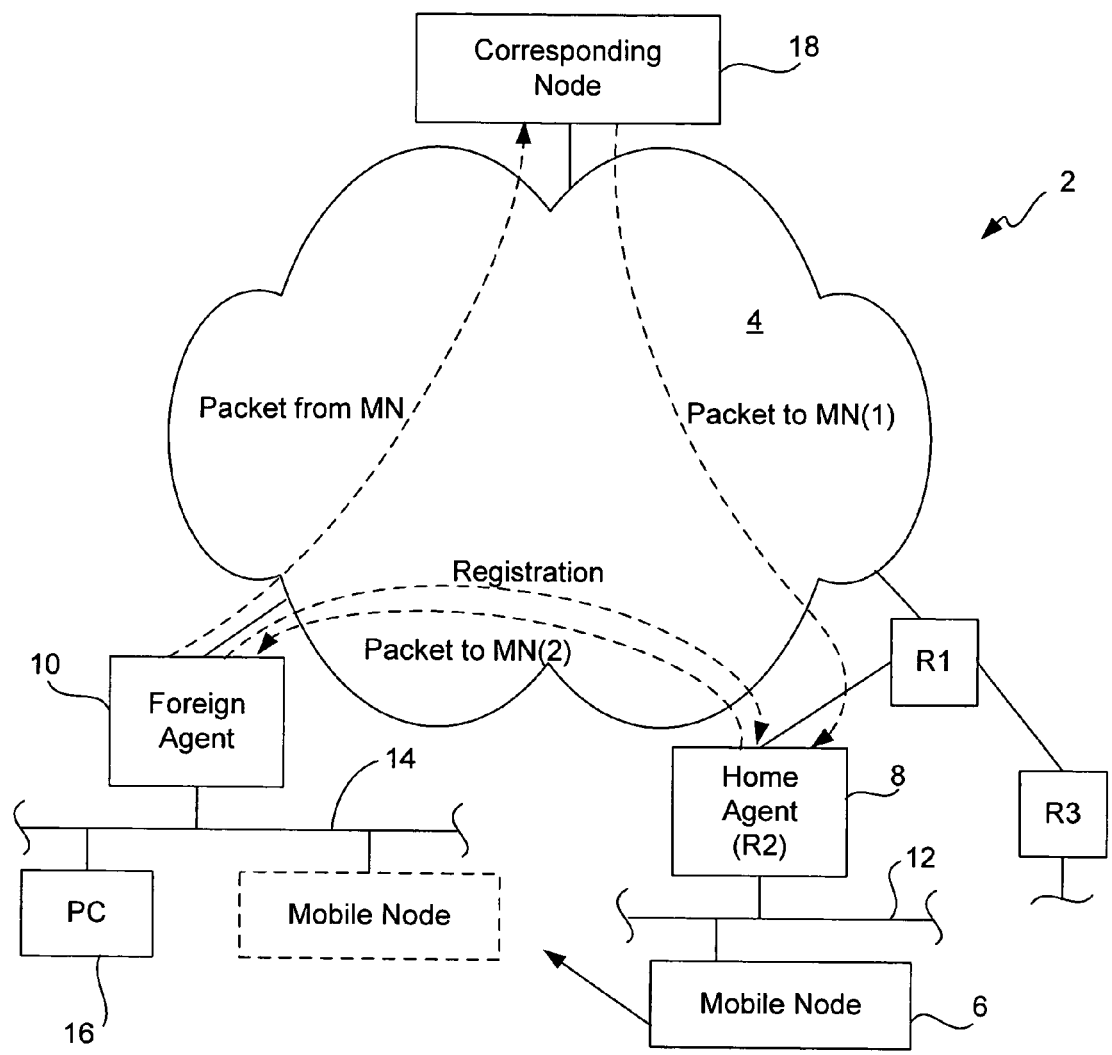
FIG. 1 is a diagram illustrating a Mobile IP network segment and associated environment.
Figure 2:
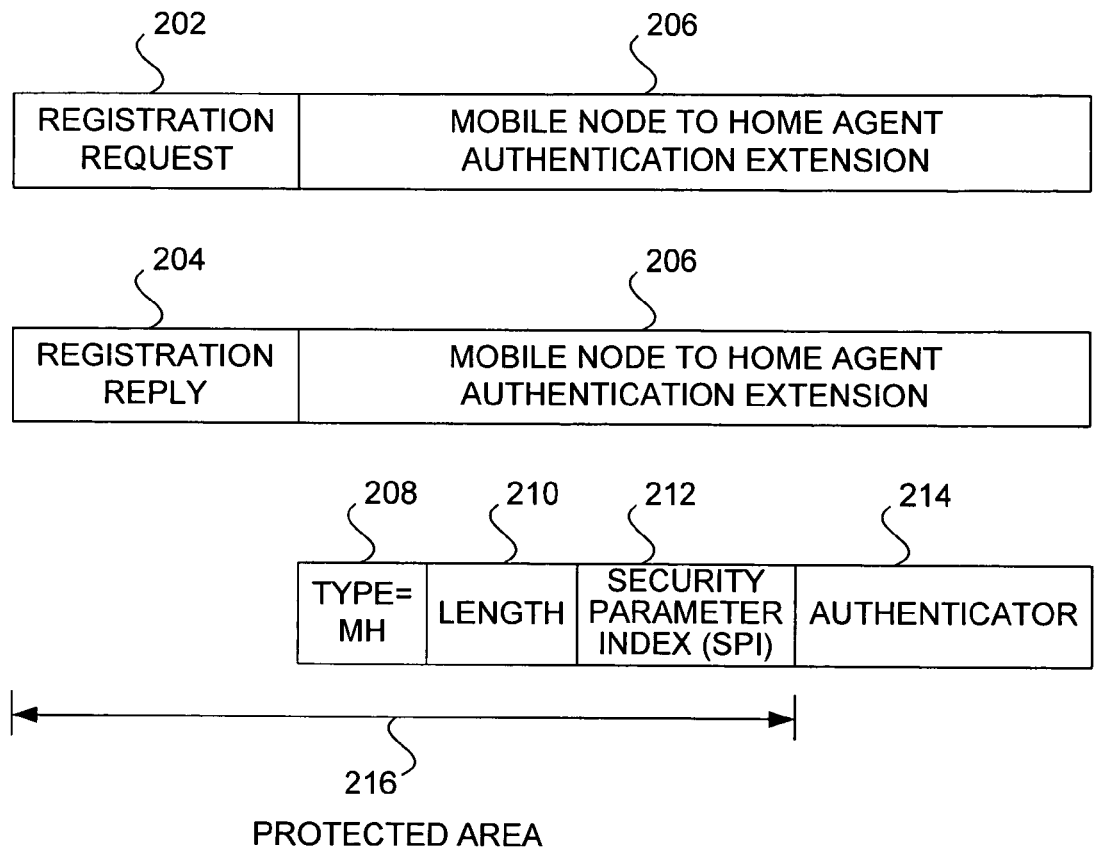
FIG. 2 is a diagram illustrating conventional Registration Request and Registration Reply packet formats having a Mobile-Home Authentication Extension.
Figure 3:
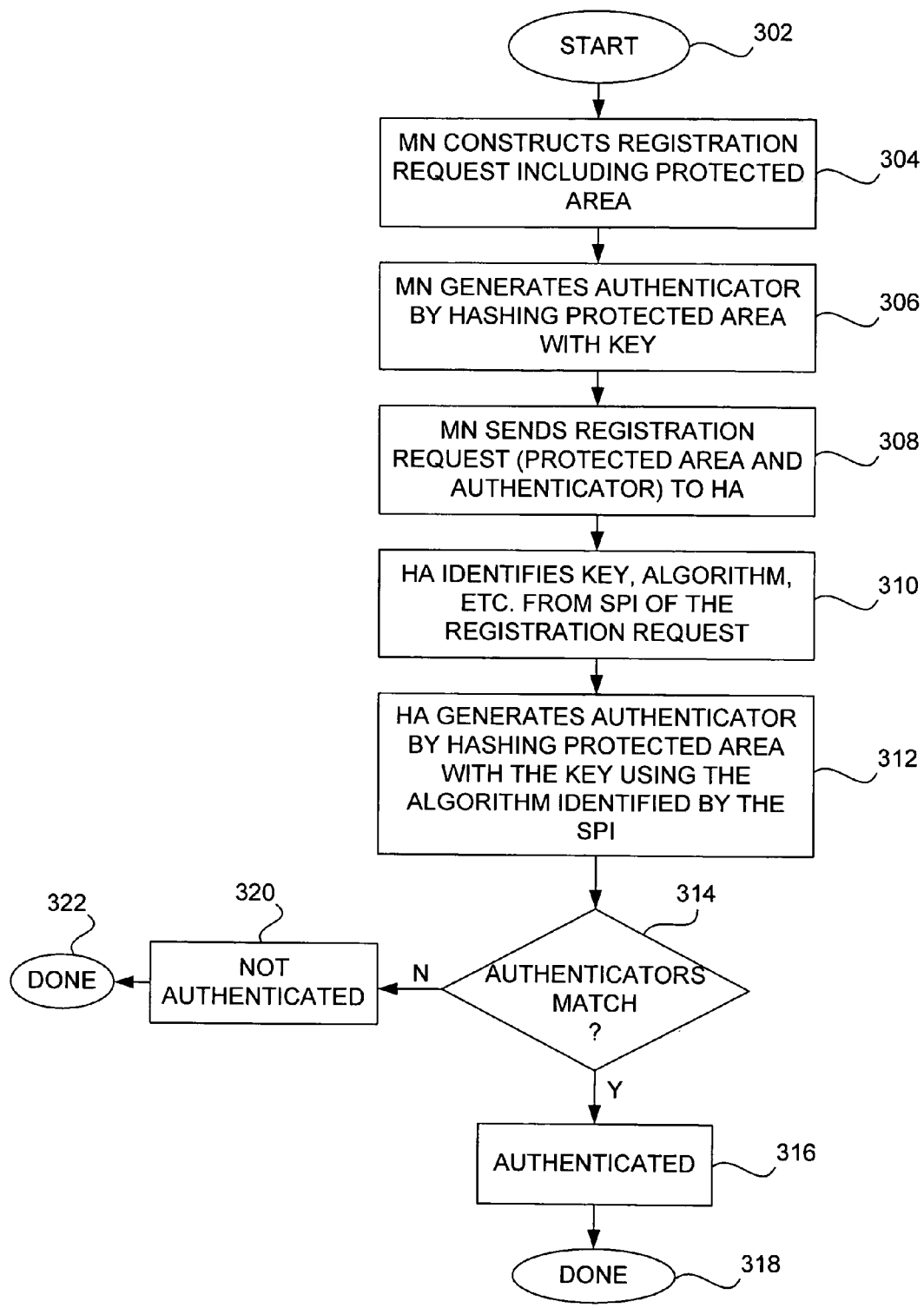
FIG. 3 is a process flow diagram illustrating the process steps performed during authentication of a mobile node.
Figure 4:
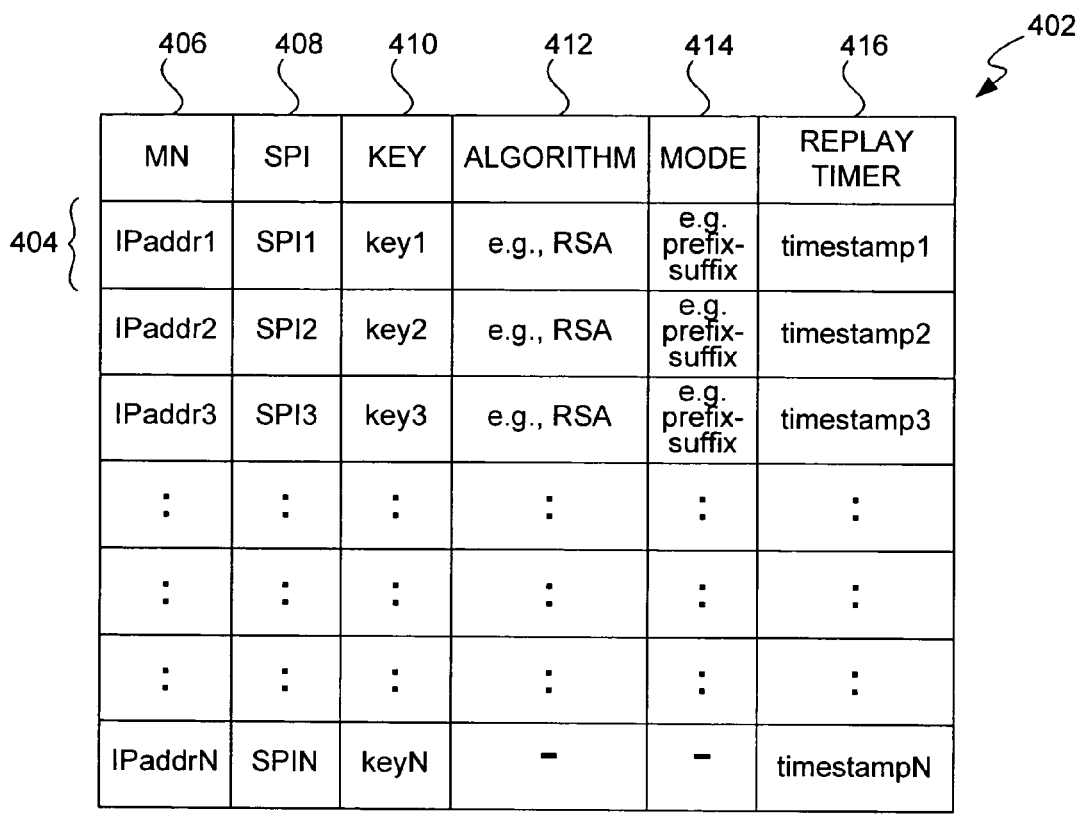
FIG. 4 is a diagram illustrating a conventional Security Association.
Figure 5:
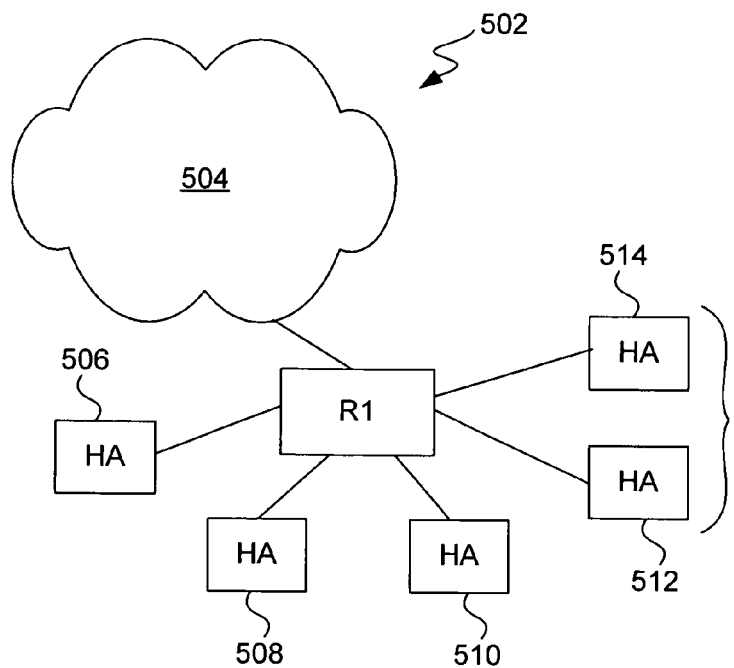
FIG. 5 is a block diagram illustrating a mobile IP network segment and associated environment without a centralized source of security keys.
Figure 6:
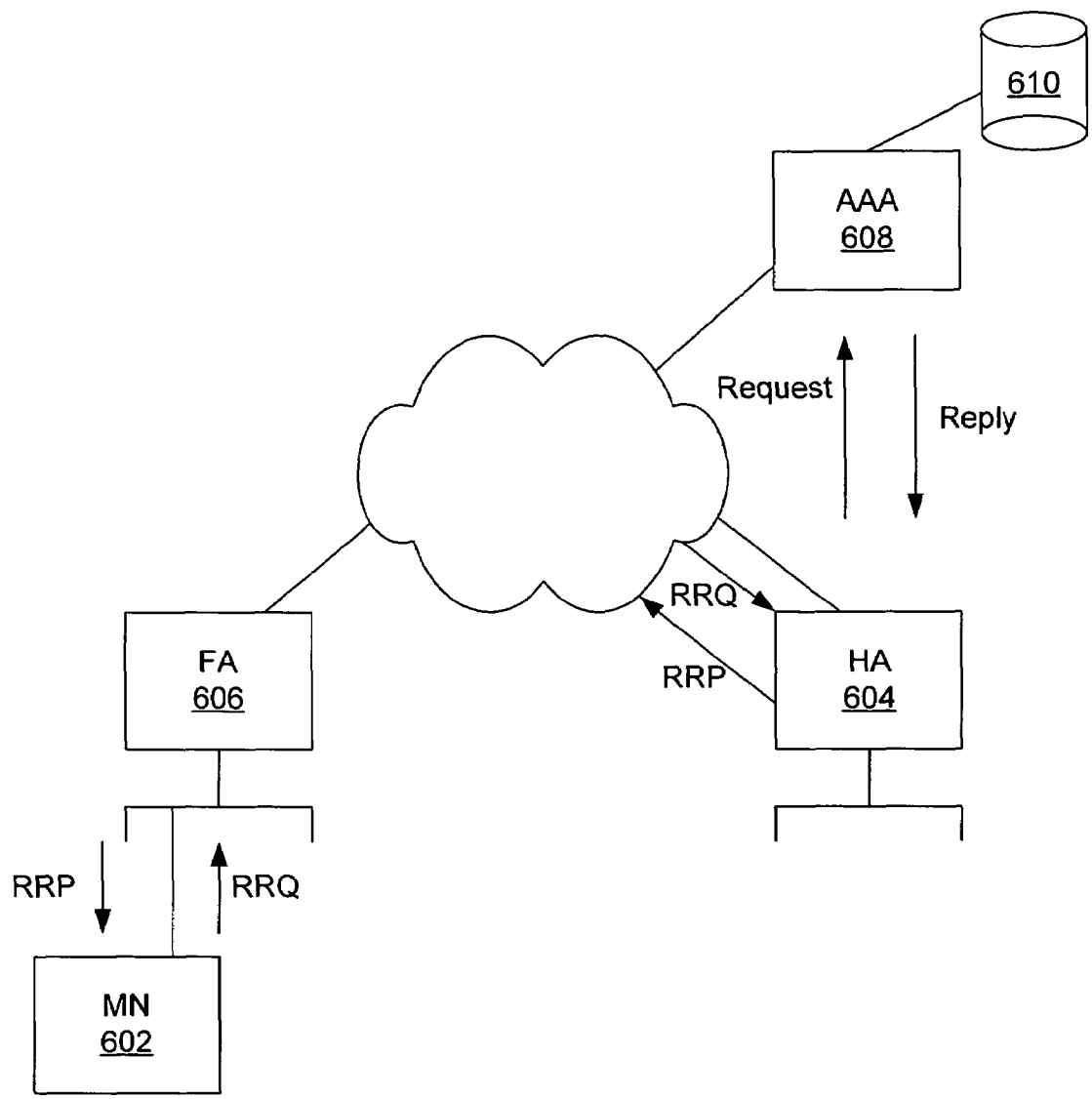
FIG. 6 is a block diagram illustrating an exemplary system in which the present invention may be implemented.

FIG. 6 is a block diagram illustrating an exemplary system in which the present invention may be implemented. When a Mobile Node 602 does not share a security association with its Home Agent 604, both the Mobile Node 602 and the Home Agent 604 may separately dynamically generate a shared key. In this manner, their identities may be authenticated during the registration process.

As shown in FIG. 6, registration may be facilitated by a Foreign Agent 606, or be performed without a Foreign Agent 606. In other words, the Mobile Node 602 may register via a collocated care-of address. In order to simplify the following description, it is assumed that the Mobile Node 602 registers via a collocated care-of address.

In order to separately generate a shared key, the Mobile Node is configured with key information such as a key "root key" or password such as a Windows™ password. From this key information, the Mobile Node may derive the shared key. The Mobile Node preferably derives the shared key in response to a registration reply received from the Home Agent. For instance, the registration reply may indicate that the shared key is to be derived by the Mobile Node.

Mobility keys may be stored on an authentication, authorization, and accounting (AAA) server that can be accessed using TACACS+ or RADIUS protocols. While authentication determines who an entity is, authorization determines what services a user is allowed to perform, or access. Various protocols such as the Remote Authentication Dial In User Service (RADIUS) and TACACS+ may be implemented to provide such a server. In addition, this protocol may similarly be implemented on each Home Agent that communicates with the server. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

The Home Agent obtains its set of key information from a AAA server 608. As described above, the AAA server 608 may store shared keys or security associations. However, in accordance with various embodiments of the invention, the AAA server stores key information from which a shared key may be derived rather than the shared keys or security associations. As described above, the key information may include a "root key" or password such as a Windows™ password. Alternatively, a secondary device 610 and/or storage medium may be accessed by the AAA server 608 to retrieve the key information. Since the shared key is not transmitted, the shared key cannot be easily discerned from a listener to the transmissions.

In addition to not transmitting the shared key, it is preferable if the initial key information is not transmitted as well. Thus, the AAA server 608 preferably derives intermediate key material to be transmitted to the Home Agent 604. The Home Agent may then derive the shared key from this intermediate key material.

In accordance with one embodiment, the secondary device 610 is a domain controller operating under the Lightweight Directory Access Protocol (LDAP). The domain controller operates using MS-Chap version 2 (MS-Chapv2). In order to authenticate the Mobile Node, the Home Agent sends a request to the AAA server 608 on behalf of the Mobile Node. The protocol that the Home Agent 604 specifies to authenticate the Mobile Node is MS-CHAPv2. The AAA server 608 may then retrieve the key information from the secondary device 610 for purposes of deriving the intermediate key material for transmission to the Home Agent 604.

The methods described herein are implemented using MS-Chapv2 to achieve dynamic key generation between the Mobile Node and Home Agent. MS-Chapv2 provides for bidirectional authentication between a client (Mobile Node) and Network Access Server (Home Agent). However, although the methods disclosed herein are described with reference to the MS-CHAPv2 protocol, key generation for Mobile IP may be performed using a variety of protocols.

Once the Home Agent and Mobile Node have separately dynamically generated the shared key, the shared key may be used to derive subsequent keys to be used in transmissions between the Home Agent and the Mobile Node. For instance, the derivation of subsequent keys may be triggered by de-registration of the Mobile Node or expiration of the lifetime of the Mobile Node. The generation of subsequent keys may therefore hinder the ability of an outsider to discover a shared key and decrypt encrypted messages.

Figure 7:
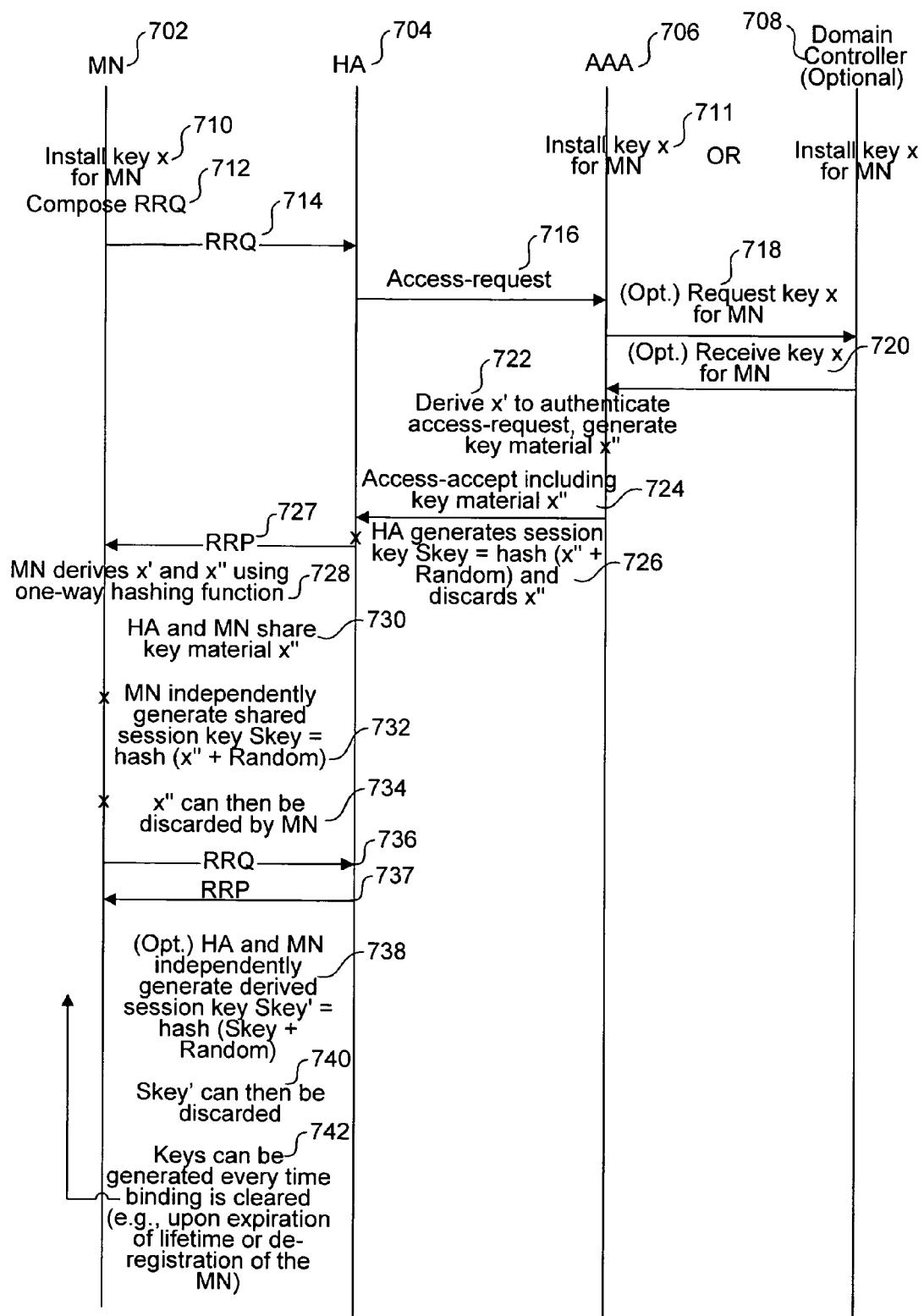
FIG. 7 is a transaction flow diagram illustrating a general method of performing dynamic key generation in accordance with various embodiments of the invention.

In the following description, a general method of performing dynamic key generation is described below with reference to FIG. 7, while a more specific method of performing dynamic key generation is described below with reference to FIG. 8. FIG. 7 is a transaction flow diagram illustrating a general method of performing dynamic key generation in accordance with various embodiments of the invention. Steps performed by the Mobile Node, Home Agent, AAA server, and Domain Controller are represented by vertical lines 702, 704, 706, and 708, respectively. As described above, key information x such as a root key or password is installed at the Mobile Node at 710. In addition, the key information x is installed at the AAA server or Domain Controller at 711.

The Mobile Node composes a registration request at 712, which is sent to the Home Agent at 714. The registration request packet may indicate that special processing is required by the Home Agent in order to dynamically generate a shared key. An exemplary registration request packet will be described in further detail below with reference to FIG. 10A. In order to obtain the Mobile Node's key information, the Home Agent sends a request message at 716 to the AAA server. For instance, the request message may be a RADIUS access request message. Alternatively, the request message may be transmitted via the TACACS+ protocol.

When the AAA server receives the request message, it may obtain the key information x from the Domain Controller if it does not store the key information x locally. Thus, the AAA server sends a request for the key information x associated with the Mobile Node at 718 to the Domain Controller. The Domain Controller then sends the key information x to the AAA server at 720.

Once the key information x is obtained or received by the AAA server, the AAA server may derive key material x' or x" to be transmitted to the Home Agent. In other words, while it is possible to transmit the key information x to the Home Agent, there is a risk that the key information x may be decrypted by a listener of the communications. If the key information x were discovered, the shared key could also be generated. Thus, rather than transmitting the key information x, it is preferable to generate key material x' or x". In accordance with one embodiment, the AAA server derives x' at 722 to authenticate the access request message previously received at 716. The AAA server then derives key material x" to be transmitted to the Home Agent 704. Specifically, the AAA server sends a reply message such as a RADIUS or TACACS+ access reply message including the key material x" at 724 to the Home Agent.

The Home Agent generates a shared session key as shown at 725. Once the session key, Skey, is generated, the key material x" used to generate the session key may be discarded by the Home Agent at 726. The Home Agent then sends a registration reply at 727 to the Mobile Node, after derivation of the shared key by the Home Agent. Specifically, if the access reply message indicates that authentication of the Mobile Node is not successful, the Home Agent does not send a registration reply. However, if the access reply message indicates that authentication of the Mobile Node is successful, the Home Agent sends a registration reply to the Mobile Node. An exemplary registration reply will be described in further detail below with reference to FIG. 11A.

When the Mobile Node receives the registration reply, it derives a shared session key from its key information (e.g., root key or password). For instance, the registration reply may indicate that the Mobile Node is to dynamically generate the shared session key. In this example, the Mobile Node derives key material x' and x" using a one-way hashing function at 728. At this point, the Mobile Node and the Home Agent are in possession of the same key material x" as shown at 730. From this key material, the Mobile Node may independently generate a shared session key as shown at 732.

A variety of formulas may be used to generate the shared session key (at the Home Agent and the Mobile Node). The only requirement is that the Mobile Node and the Home Agent generate the shared session key via the same formula. In this example, the shared session key, Skey, is derived from the following formula:

$$Skey = hash\ (key\ material\ x''+ random\ number) \quad (1)$$

The "hash" function can be any secure one-way hash function, such as MD5 or HMAC-MD5. Once the session key, Skey, is generated, the key material x" used to generate the session key may be discarded by the Mobile Node at 734.

Figure 10A:
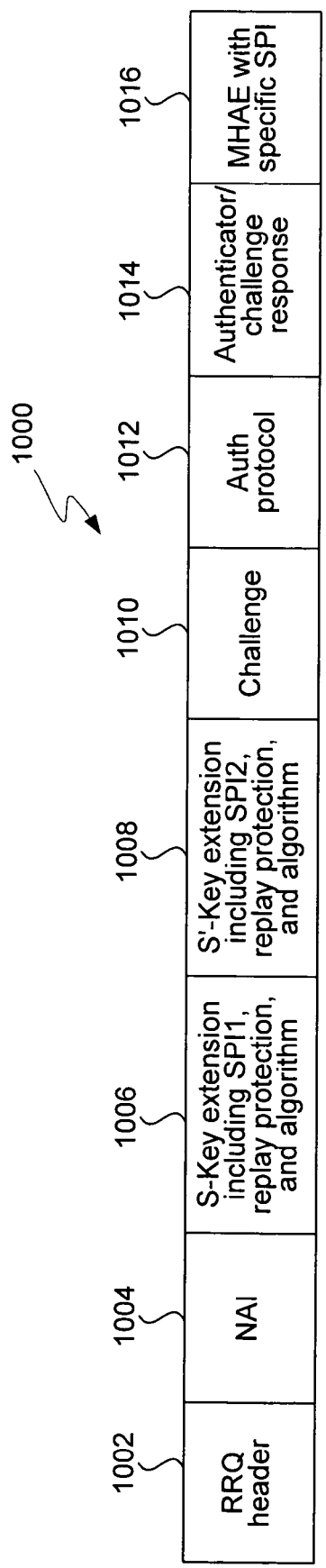
FIG. 10A is a diagram illustrating an exemplary registration request message that may be transmitted by a Mobile Node in accordance with various embodiments of the invention.
Figure 10B:
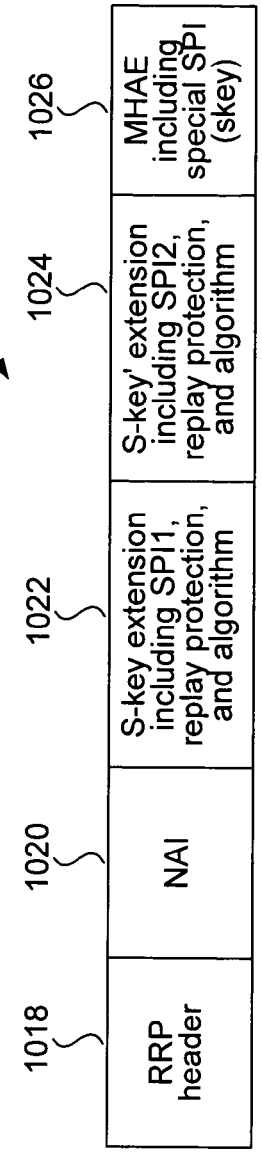
FIG. 10B is a diagram illustrating an exemplary registration reply message that may be transmitted by a Home Agent to a Mobile Node in accordance with various embodiments of the invention.

As will be described in further detail below with reference to FIG. 8, a subsequent derived session key, Skey', may be derived from master Skey. The use of the derived Skey' may minimize the number of messages authenticated using the master Skey to maintain the secrecy of the master Skey. This derived session key, Skey', may then be periodically "refreshed." Specifically, at 736 the Mobile Node may send a subsequent registration request to the Home Agent in order to "refresh" the shared session key, Skey'. An exemplary subsequent registration request will be described in further detail below with reference to FIG. 10B. Since the Mobile Node and the Home Agent now share a session key (Skey), the Home Agent is able to authenticate the Mobile Node without contacting the AAA server. As described above, Skey is generated using x". Once the lifetime expires, the Home Agent and Mobile Node preferably discard all dynamic keys (e.g., Skey and Skey') and thus the Mobile Node sends a registration request as shown in FIG. 10A to reinitiate the key generation. Typically, the Mobile Node sends a registration request before the lifetime expires. Skey' can therefore be derived while the Skey still exists and such messages are authenticated using Skey, as shown in FIG. 10B and FIG. 11B.

A subsequent registration reply is then sent by the Home Agent at 737 to the Mobile Node, either before or after generation of the shared key by the Home Agent. The registration reply is authenticated using Skey, and therefore it is irrelevant whether Skey' has been derived prior to sending the subsequent registration reply. The subsequent registration reply preferably indicates to the Mobile Node that it is to generate a new session key, as set forth above. An exemplary subsequent registration reply will be described in further detail below with reference to FIG. 11B.

It may be desirable to generate a new session key upon successful re-registration of the Mobile Node. Thus, the Home Agent and the Mobile Node independently generate a derived session key at 738 from the previously used session key. In this example, the derived session key, Skey', is derived from the following formula:

$$Skey' = hash\ (Skey + random\ number) \quad (2)$$

Once the Home Agent and the Mobile Node have independently derived the new session key, Skey', the previous session Skey' (if existing) may be discarded by the Home Agent and Mobile Node as shown at 740 and FIG. 10A. However, Skey remains the same and is not discarded. The Skey may therefore be subsequently used for purposes of generating a new Skey' by sending a registration request as shown in FIG. 10B. The Skey remains unmodified until he MN reinitiates authentication at 712 and shown in FIG. 10A. Keys may also be discarded each time the Mobile Node de-registers with the Home Agent, requiring key generation upon subsequent re-registration with the same or a different Home Agent as shown at 742 in accordance with the above-described process based upon the previous session key.

Figure 8:
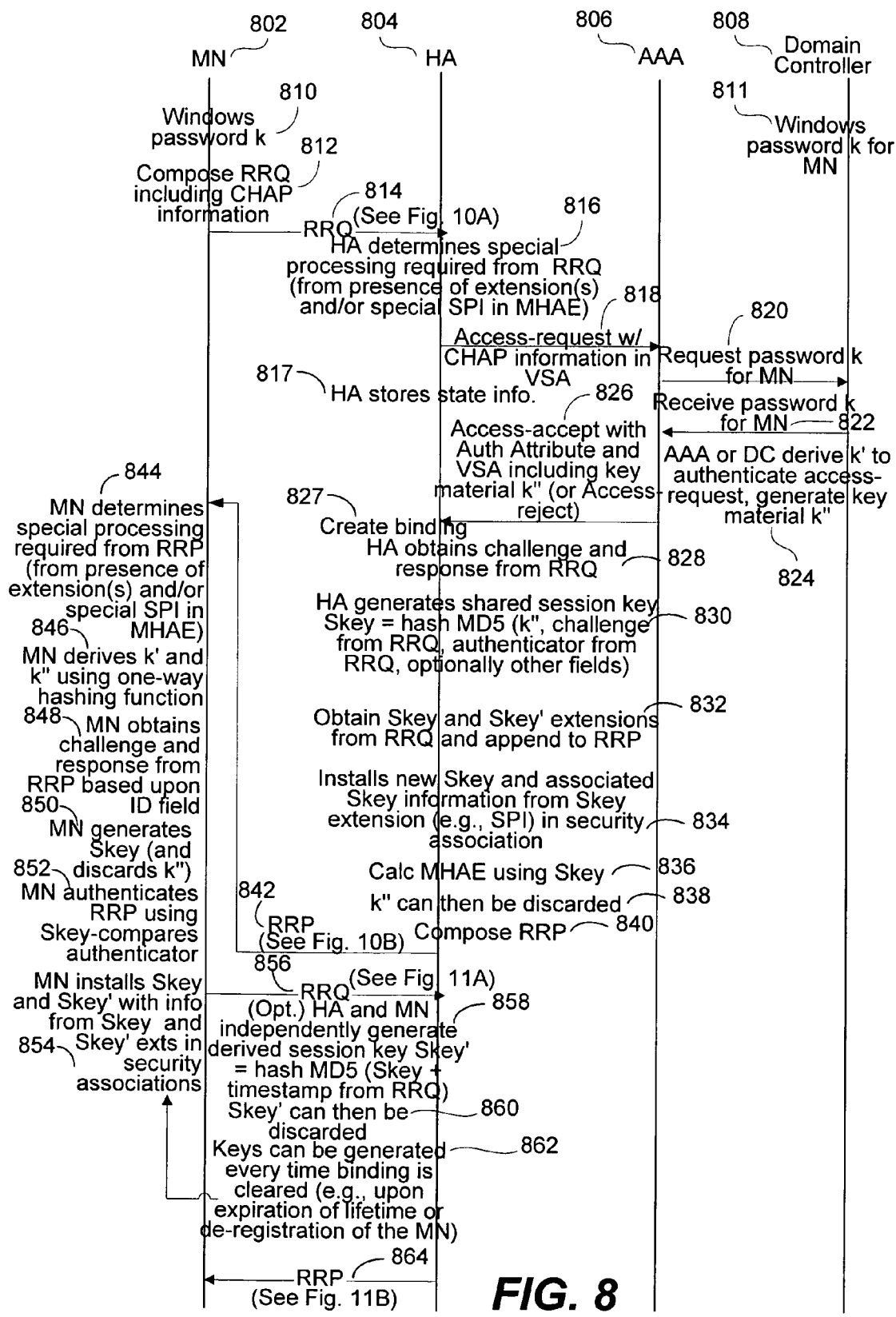
FIG. 8 is a transaction flow diagram illustrating a specific method of performing dynamic key generation in accordance with various embodiments of the invention.

FIG. 8 is a transaction flow diagram illustrating a specific method of performing dynamic key generation in accordance with various embodiments of the invention. Steps performed by a Mobile Node, Home Agent, AAA server, and Domain Controller operating under LDAP represented by vertical lines 802, 804, 806, and 808, respectively. A Windows™ password is installed at the Mobile Node at 810 as well as at the Domain Controller at 811.

Typically, the NAS server sends a NAS-challenge to the client. The client generates a peer-challenge and a challenge response based on the following: the username (which can be derived from the Network Access Identifier (NAI) by stripping off realm and "@)", the NAS-Challenge, peer-challenge, and MD5 hash of the hashed password k. In the Windows™ environment, the username for response calculation is of the form: domain\username. RFC-2759, "Microsoft PPP CHAP Extensions, Version 2," G. Zorn, January 2000 discloses the format of PPP CHAP extensions as implemented in the Microsoft Windows™ environment, and is incorporated herein by reference for all purposes. Since in terms of Mobile IP, the Mobile Node does not send an indication to the Home Agent that it wants to register until a registration request is sent (which has to be authenticated), the Home Agent does not know of the Mobile Node's presence or intention and thus cannot send a NAS-Challenge. Thus, the solution is for the Mobile Node to generate a NAS challenge and embed it in the registration request message. The username is implicitly carried in the NAI extension. The domain name information (if available and used for response calculation) is carried in a separate extension. The peer challenge is calculated by calculating hash (MD5) of the registration request, after zero-filling the challenge response extension value. The challenge response is filled for the Home Agent/AAA/backend database to authenticate the registration request. The domain name, peer-challenge, authentication protocol and SPI information for keys are carried in Mobile IP extensions. These are of the form TLV (type/length/value) and are derived as specified in RFC-3115, "Mobile IP Vendor/Organization-Specific Extensions," Dommety et al, April 2001, which is incorporated herein by reference for all purposes.

In order to initiate a Mobile IP session, the Mobile Node composes a registration request at 812 and sends it to the Home Agent at 814. A method of composing a registration request will be described in further detail below with reference to FIG. 9. Specifically, in order to enable the Mobile Node to be authenticated, the Mobile Node provides CHAP information in the registration request, such as the CHAP challenge and response. An exemplary registration request will be described in further detail below with reference to FIG. 10A.

When the Home Agent receives the registration request packet at 816, the Home Agent determines whether special processing of the registration request is required. For instance, this may be determined from the presence or absence of one or more extensions and/or a specific SPI in the registration request (e.g., the Mobile-Home Authentication Extension (MHAE)). In this manner, the Home Agent may ascertain that the Home Agent is to derive a shared key between the Mobile Node and the Home Agent. For instance, the shared key may be derived from key information obtained from a AAA server.

In order to keep track of pending registration requests and key information that has been received from a AAA server, the Home Agent stores state information associated with the registration request at 817. For instance, the state information may include information provided in the registration request. The Home Agent may then send a request message such as a RADIUS or TACACS+ access-request identifying the Mobile Node at 818 to a AAA server. The access-request preferably includes CHAP information in a vendor specific attribute (VSA). The CHAP information may include the CHAP challenge and response.

As described above, a password or key, k, is configured at the Mobile Node as well as the AAA server (or at a domain controller). For instance, the password or key may comprise a Windows™ password associated with the Mobile Node.

In the presence of a domain controller, the AAA server sends the username, domain name and chap challenge and response in an access request message at 820 to the domain controller for authentication of the Mobile Node. If authentication is successful, the AAA server receives the key material k" and a success code as an access reply as shown at 822 and 824. In this manner, the AAA server returns the key material k" to the Home Agent.

In the absence of a domain controller, the AAA server is aware of k (and thus k'). Specifically, the AAA server either receives the key or password at 822 from the domain controller from which it may derive the key information k' and generate the key material k" at 824, or the AAA server locally authenticates the chap request and if successful, returns k" to the HA in an access-accept message.

As described above, challenge response is filled for the Home Agent, AAA server, or backend database to authenticate the registration request. If authentication by the AAA server or backend database is successful, the Home Agent has indirectly authenticated the registration request.

If the authentication is successful, the AAA or domain controller may then derive key material k" from the key information. The AAA server then sends a reply message (e.g., access-accept message or access-reject message) at 826 to the Home Agent including the key material k" (upon successful authentication) associated with the Mobile Node, thereby enabling the Home Agent to derive a shared key to be shared between the Home Agent and the Mobile Node. The access-accept message includes a VSA for the key material (k"). For instance, the VSA may be a Microsoft Point-to-Point Encryption AAA attribute in accordance with RFC 2548, "Microsoft Vendor-specific RADIUS Attributes," G. Zorn, March 1999, which is incorporated herein by reference for all purposes.

Upon receipt of the reply message (e.g., access-accept message) by the Home Agent indicating that the Mobile Node has been authenticated, the Home Agent creates a binding in a mobility binding table between the Mobile node and the care-of address specified in the registration request at 827. The Home Agent may then derive the shared key from the key material k". In accordance with one embodiment, in order to derive the shared key, the Home Agent obtains the CHAP challenge and response from the registration request at 828. The Home Agent then generates the shared session key using the CHAP challenge and response and the key material k" at 830. Specifically, the Home Agent performs an MD5 hashing function on the key material k", the CHAP challenge and response. In order to store a security association and enable the Mobile Node to generate a corresponding security association, the Home Agent obtains Skey and Skey' extensions from the registration request in order to append these extensions to a registration reply at 832. For instance, the Skey and Skey' extensions may specify the SPI and other related information. These extensions will be described in further detail below with reference to FIG. 10A and FIG. 10B. The Home Agent then installs the shared key, Skey, and associated Skey information from the Skey extension in a security association table at 834. In addition, the Home Agent preferably installs the derived shared key, Skey', and associated Skey' information from the Skey' extension in the security association. This enables the Skey' to be used for authenticating subsequent registration requests, which minimizes Skey usage and possibility of compromise of the Skey. Specifically, the Home Agent installs the key/derived key, the SPI, the replay protection timestamp, and the encryption algorithm in a security association. The MHAE is then calculated using the shared session key (Skey). The key material k" may then be discarded at 838.

The registration reply having the Skey and Skey' extensions is then composed at 840 is then sent at 842 to the Mobile Node. Note that these extension are identical to those that were received in the registration request. Specifically, the Home Agent may have selected a different SPI for each extension to set up a unidirectional Security Association. The actual keys, Skey and Skey', are not sent in these extensions. The Home Agent may also provide information in an extension to the registration reply that enables the MN to authenticate the HA (if bidirectional authentication is desired). An exemplary registration reply will be described in further detail below with reference to FIG. 10B.

In response to its registration request, the Mobile Node receives a registration reply from the Home Agent at 844. The Mobile Node may then determine from the registration reply whether special processing is to be performed by the Mobile Node. In other words, the registration reply may indicate that the Mobile Node is to derive a key to be shared between the Mobile Node and the Home Agent. For instance, the Mobile Node may ascertain from the presence of one or more extensions to the registration reply and/or a particular SPI in the registration reply (e.g., MHAE) may indicate that the Mobile Node is to derive the shared key between the mobile Node and the Home Agent.

As described above at 810, key information k is stored at the Mobile Node. The key information may be, for example, a root key, or a password such as a Windows™ password. From this key information, the Mobile Node may derive the shared session key. In addition, a subsequent session key may be derived from a previous session key, as will be described in further detail below with reference to steps 856-864.

In order to derive the shared session key, the MN derives k' and k" at 846 using a one-way hashing function, as described above. In addition, the MN obtains the CHAP challenge and response from the registration reply at 848. Specifically, the MN can correlate the registration request previously sent with the registration reply based upon an ID field in the registration request and reply. The Mobile Node then generates the shared session key from the key information k, as described above with reference to the Home Agent, and discards k" at 850. The Mobile Node then authenticates the registration reply using the shared key and compares the result with the authenticator in MHAE at 852. Once the Mobile Node has authenticated the registration reply, it installs both the session key, Skey, and the derived session key, Skey', with the information obtained from the Skey and Skey' information obtained from the Skey and Skey' extensions, respectively, in the security association at 854. Specifically, the Mobile Node installs the key/derived key, the SPI, the replay protection timestamp, and the algorithm in a security association.

Once the master Skey and derived Skey' are installed, a subsequent registration request can be sent to refresh/renegotiate the derived Skey'. Such messages are authenticated using the master Skey. In addition, the registration request contains the Skey' extension indicating that the Skey' is to be generated. The registration reply in such cases is authenticated using the master Skey and contains the Skey' extension to indicate that the Skey' is to be generated.

In order to refresh the shared key for use in subsequent transmissions between the Mobile Node and Home Agent, it may be desirable to derive a subsequent session key from the shared session key previously derived. In other words, since the shared session key is already in use for a period of time or a number of transmissions, there is a risk that a listener may intercept these communications and determine the session key that is used. Thus, it may be desirable to periodically generate a new session key from the session key previously used (e.g., after a specified period of time or number of transmissions).

In order to refresh the session key, a subsequent registration request is sent by the Mobile Node to the Home Agent at 856. An exemplary subsequent registration request will be described in further detail below with reference to FIG. 11A. The Home Agent and Mobile Node independently generate a derived session key, Skey', at 858. For instance, the derived session key Skey' is generated by using an MD5 hashing function of the Skey and a random number (e.g., timestamp obtained from the registration request). Thus, in order to refresh the derived session key, Skey', the Skey is used. In addition, the initial, unchanging Skey is used for purposes of authenticating this subsequent registration request. The previous derived session key, Skey', can then be discarded at 860. Subsequent session keys can be generated each time a binding is cleared (e.g., upon expiration of the lifetime of the Mobile Node or de-registration of the Mobile Node) at 862 as described above. A subsequent registration reply is sent by the Home Agent to the Mobile Node at 864. An exemplary subsequent registration reply will be described in further detail below with reference to FIG. 11B.

Figure 9:
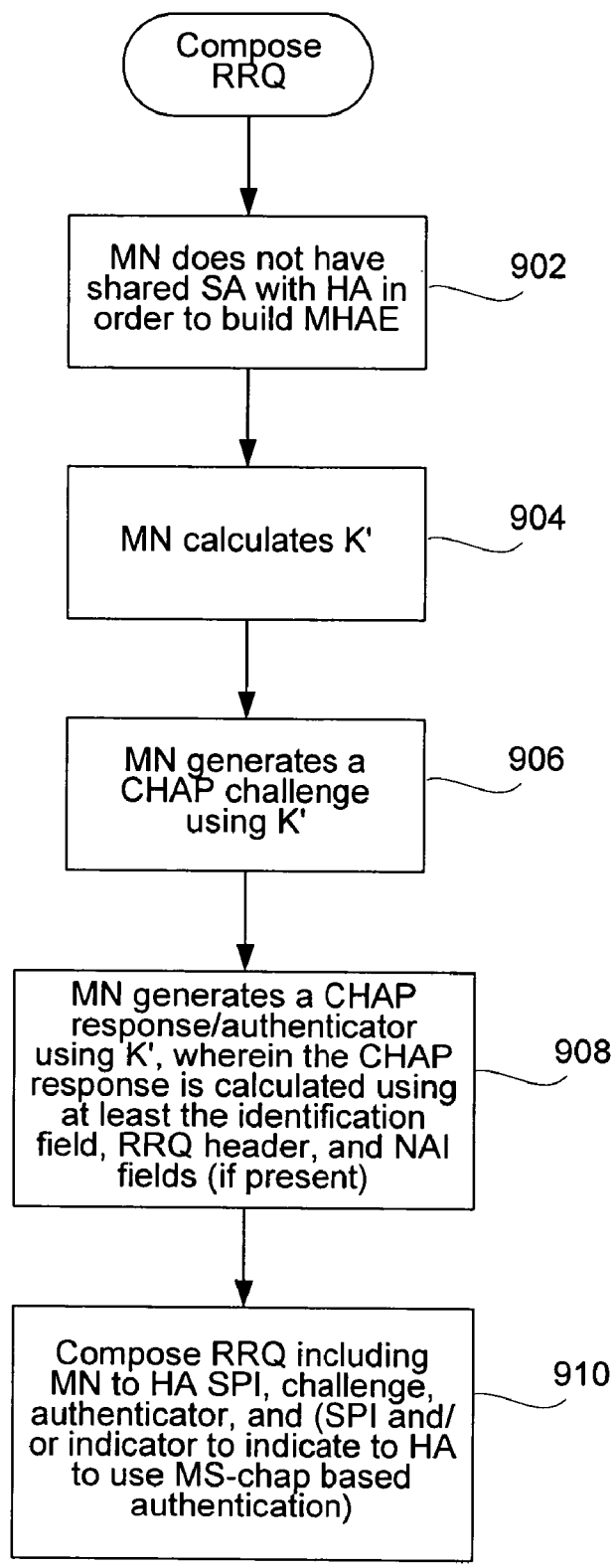
FIG. 9 is a process flow diagram illustrating a method of composing a registration request as illustrated at block 812 of FIG. 8.

FIG. 9 is a process flow diagram illustrating a method of composing a registration request as illustrated at block 812 of FIG. 8. In order to compose a registration request for a Mobile Node that does not have a shared security association with its Home Agent, the Mobile Node needs a mechanism for building a MHAE for authentication purposes as shown at block 902. Thus, the Mobile Node calculates k' and generates a CHAP challenge at block 904. The Mobile Node then generates a CHAP response/authenticator using k' at block 906, where the CHAP response is calculated using at least the identification field, registration request header, and NAI fields (if present) at block 908. The Mobile Node then composes a registration request at block 910 including the Mobile Node to Home Agent SPI, challenge, and authenticator. In addition, the registration request includes a special SPI and/or an indicator to indicate to the Home Agent that special processing is required (e.g., to use MS-CHAP based authentication).

FIG. 10A is a diagram illustrating an exemplary registration request message that may be transmitted by a Mobile Node in accordance with various embodiments of the invention as shown at 814 of FIG. 8. As shown, the registration request 1000 includes a header 1002, Network Access Identifier (NAI) extension including a NAI 1004 including the username, an S-key extension 1006 including SPI1, replay protection timestamp, and identifying the algorithm to be used to authenticate the registration request. The registration request 1000 also includes a S'-key extension 1008 including SPI2, replay protection timestamp, and algorithm to be used for subsequent re-registrations, as well as to be used to enable the Mobile Node to be authenticated using the derived session key, Skey', where the Skey' is set up during initial registration. Some additional information may be added in registration requests and registration replies to facilitate a specific protocol. For example, to use MS-Chapv2, the "domain-name" name is transmitted to the Home-Agent in a domain-name extension. Thus, the registration request 1000 also includes the CHAP "peer" challenge 1010 carrying the "peer" challenge, authentication protocol 1012, authenticator/challenge response 1014, and MHAE 1016 including the specific SPI. Formats for extensions to registration and reply extensions are set forth in RFC 3115, "Mobile IP Vendor/Organization-Specific Extensions," Dommety et al, April 2001, which is incorporated by reference for all purposes. In addition, challenge and response extensions are provided as set forth in RFC 3012, "Mobile IPv4 Challenge/Response Extensions," Perkins et al, November 2000, which is incorporated herein by reference for all purposes. For instance, the presence of the authentication protocol extension 1012 in the registration request indicates a protocol to be used to authenticate the registration request and derive the shared key. An example protocol depicted in this application to authenticate the Mobile Node and derive the shared key(s) using a AAA infrastructure is MS-CHAPv2.

FIG. 10B is a diagram illustrating an exemplary registration reply message that may be subsequently transmitted to a Mobile Node in accordance with various embodiments of the invention as shown at 842. As shown, the registration reply 1017 includes a registration reply header 1018, NAI 1020, S-key extension 1022 and S'key extension 1024 as described above, and MHAE 1026 including special SPI associated with the Skey. Specifically, the presence of the Skey extension in the registration reply may indicate that the Skey needs to be derived, while the presence of the Skey' extension in the registration reply may indicate that the Skey' needs to be derived or refreshed using Skey.

Figure 11A:
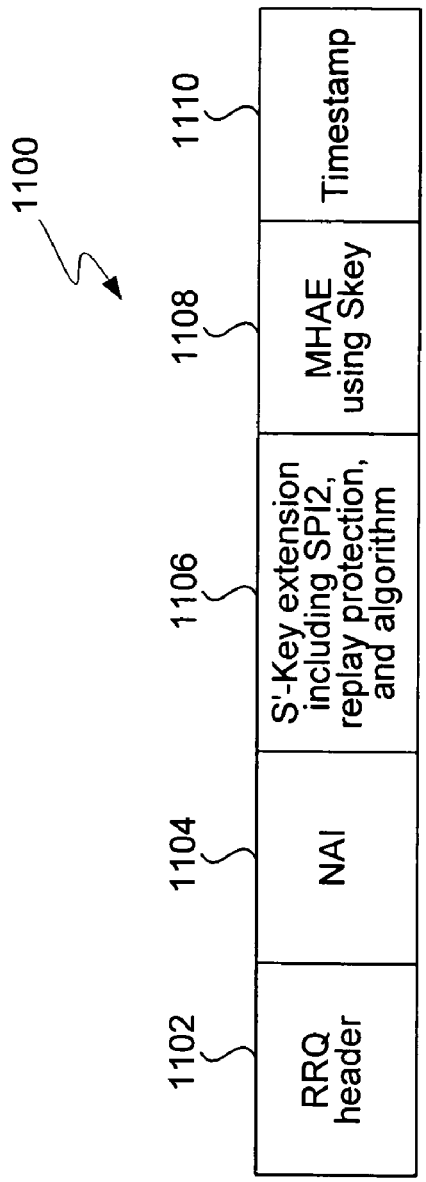
FIG. 11A is a diagram illustrating an exemplary registration reply message that may be subsequently transmitted by a Mobile Node in accordance with various embodiments of the invention.
Figure 11B:
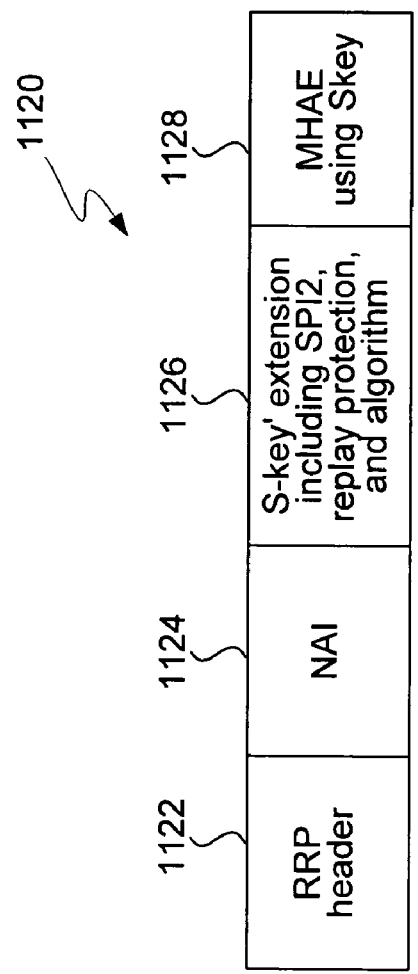
FIG. 11B is a diagram illustrating an exemplary registration reply message that may be subsequently transmitted by a Home Agent to a Mobile Node to initiate a subsequent rekeying in accordance with various embodiments of the invention.

FIG. 11A is a diagram illustrating an exemplary registration request message that may be transmitted by a Mobile Node to initiate subsequent rekeying as shown at 856 in accordance with various embodiments of the invention. The registration request 1100 includes a registration request header 1102, NAI 1104, S'-key extension 1106, and MHAE 1108 calculated using Skey. Replay protection is achieved by providing a timestamp 1110 in the registration request. This timestamp is provided since the Home Agent does not validate the challenge 1010, since it did not generate the challenge 1010.

FIG. 11B is a diagram illustrating an exemplary registration reply message that may be subsequently transmitted by a Home Agent to a Mobile Node to initiate a subsequent rekeying (e.g., of the derived session key, Skey') as shown at 864 in accordance with various embodiments of the invention. The registration reply 1120 includes a registration reply header 1122 including a timestamp, NAI 1124, S'-key extension 1126, MHAE 1128 calculated using Skey.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Access Points of this invention may be implemented in specially configured routers or servers, as well as Cisco Aironet Access Points, available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 12:
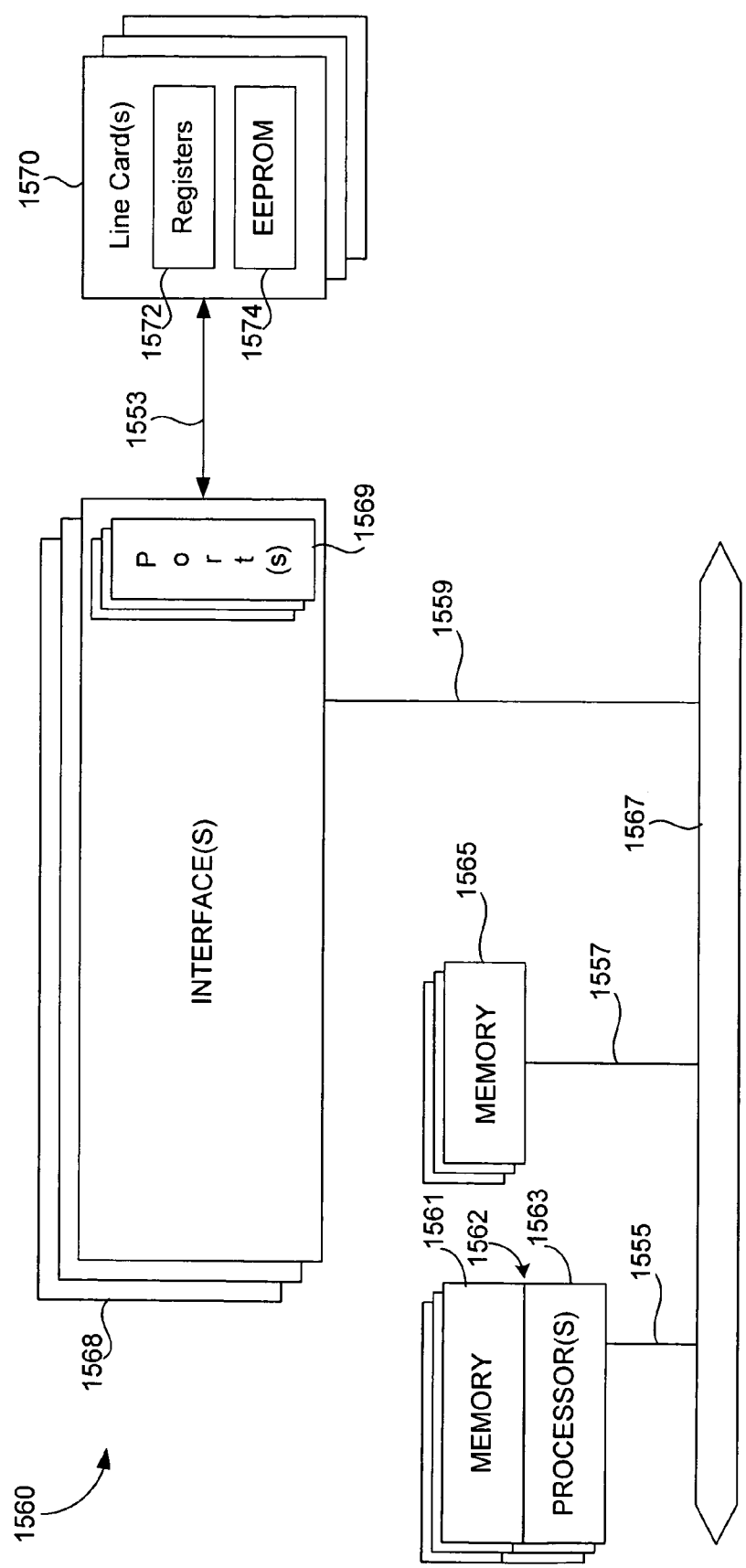
FIG. 12 is a block diagram of a network device that may be configured to implement aspects of the present invention.

Referring now to FIG. 12, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although not shown, various removable antennas may be used for further increase range and reliability of the access points. In addition, radio transmit power e.g., 1, 5, 20, 30, 50, and 100 mW) on the Cisco Aironet—Access Point Series is configurable to meet coverage requirements and minimize interference. In addition, a Cisco Aironet AP can be configured as a redundant hot standby to another AP in the same coverage area. The hot-standby AP continually monitors the primary AP on the same channel, and assumes its role in the rare case of a failure of the primary AP.

Although the system shown in FIG. 12 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described the use of a master session key, Skey, and a derived session key, Skey', during initial registration as well as re-registration, it is also possible to use a single session key, Skey in the initial registration process and/or the re-registration process. However, it would then be necessary to use the AAA server to refresh the Skey. Thus, through the use of both the master Skey and derived Skey' it is possible to refresh the Skey' without the use of the AAA server. Accordingly, the present embodiments are to be considered as illustrative and not restrictive, and the invention is not to be limited to the details given herein, but may be modified within the scope and equivalents of the appended claims.

What is claimed is:

1. In a server adapted for authentication, authorization, and accounting, a method of generating a shared key between a Home Agent and a Mobile Node, comprising:

receiving a request message by the server from a Home Agent, the request message identifying the Mobile Node;

deriving key information by the server from a key or password associated with the Mobile Node; and sending a reply message by the server to the Home Agent, the reply message including the key information associated with the Mobile Node, thereby enabling the Home Agent to derive a shared key to be shared between the Mobile Node and the Home Agent from the key information;

wherein the reply message does not include the shared key to be shared between the Mobile Node and the Home Agent in any form.

2. The method as recited in claim 1, wherein deriving key information comprises:
deriving the key information from a second set of key information derived from the key or password.

3. The method as recited in claim 1, wherein deriving key information comprises:
obtaining the derived key information from a domain controller or server.

4. The method as recited in claim 1, wherein the request message is an access request message and the reply message is an access reply message.

5. The method as recited in claim 1, further comprising:
obtaining the key or password from a domain controller.

6. The method as recited in claim 5, wherein obtaining the key or password from the domain controller comprises:
sending a request to the domain controller for key or password associated with the Mobile Node; and
receiving the key or password associated with the Mobile Node from the domain controller.

7. The method as recited in claim 1, further comprising:
applying the key information to authenticate the request message.

8. The method as recited in claim 1, wherein the key or password is stored at the Mobile Node, thereby enabling the Mobile Node to derive the key information from the key or password.

9. The method as recited in claim 1, wherein deriving key information from a key or password associated with the Mobile Node includes:
deriving the key information from a password, wherein the key information is not derived from a key.

10. The method as recited in claim 1, the reply message does not include the shared key to be shared between the Mobile Node and the Home Agent in an encrypted form or a decrypted form.

11. In a Home Agent supporting Mobile IP, a method of authenticating a Mobile Node, comprising:
receiving a Mobile IP registration request by the Home Agent from a Mobile Node, the Mobile IP registration request identifying the Mobile Node;
sending a request message by the Home Agent to a AAA server, the request message identifying the Mobile Node;
receiving a reply message by the Home Agent from the AAA server, the reply message including key information associated with the Mobile Node;
deriving a key by the Home Agent from the key information, the key being a shared key between the Mobile Node and the Home Agent, wherein deriving the key from the key information does not include decryption of the key information; and
sending a Mobile IP registration reply by the Home Agent to the Mobile Node, wherein the Mobile IP registration reply does not include the key in any form.

12. The method as recited in claim 11, wherein the Mobile IP registration request includes a CHAP challenge and response.

13. The method as recited in claim 11, wherein deriving a key from the key information comprises deriving the key from the key information and a CHAP challenge and response obtained from the Mobile IP registration request.

14. The method as recited in claim 11, wherein deriving the key and sending the Mobile IP registration reply to the Mobile Node are performed when the reply message received from the AAA server indicates that the Mobile Node is successfully authenticated.

15. The method as recited in claim 11, wherein the request message is an access request message and the reply message is an access reply message.

16. The method as recited in claim 11, wherein the Mobile Node is to derive the shared key from a second set of key information stored at the Mobile Node.

17. The method as recited in claim 16, wherein the key information is equivalent to the second set of key information.

18. The method as recited in claim 16, wherein the second set of key information stored at the Mobile Node is a root key, a password, or a key shared between the Mobile Node and the Home Agent in a previous session.

19. The method as recited in claim 18, wherein the registration request includes a SPI, replay protection timestamp, and indicates an algorithm to be used to authenticate the registration reply, wherein the SPI, the replay protection timestamp, and the algorithm are associated with the second set of key information.

20. The method as recited in claim 19, further comprising:
installing the derived key, the SPI, the replay protection timestamp, and the algorithm in a security association.

21. The method as recited in claim 18, wherein the registration reply includes a SPI, replay protection timestamp, and indicates an algorithm to be used to authenticate the registration reply, wherein the SPI, the replay protection timestamp, and the algorithm are associated with the second set of key information.

22. The method as recited in claim 11, wherein the Mobile IP registration reply indicates that the Mobile Node is to derive the shared key between the Mobile Node and the Home Agent.

23. The method as recited in claim 22, wherein at least one of the presence of one or more extensions in the Mobile IP registration reply and an SPI in the Mobile IP registration reply indicates that the Mobile Node is to derive the shared key between the Mobile Node and the Home Agent.

24. The method as recited in claim 11, wherein the Mobile IP registration request indicates that the Home Agent is to derive the shared key between the Mobile Node and the Home Agent from the key information.

25. The method as recited in claim 24, wherein at least one of the presence of one or more extensions in the Mobile IP registration request and an SPI in the Mobile IP registration request indicates that the Home Agent is to derive the shared key between the Mobile Node and the Home Agent.

26. The method as recited in claim 24, wherein the presence of an authentication protocol extension in the Mobile IP registration request indicates a protocol to be used to authenticate the Mobile IP registration request and derive the shared key.

27. The method as recited in claim 24, wherein the presence of a session key extension and derived session key extension in the registration request indicates that both a session key and a derived session key are to be generated and installed.

28. The method as recited in claim 27, further comprising:
receiving a subsequent Mobile IP registration request from the Mobile Node to refresh the derived session key.

29. The method as recited in claim 28, further comprising: authenticating the subsequent Mobile IP registration request using the session key.

30. The method as recited in claim 28, further comprising: sending a subsequent Mobile IP registration reply to the Mobile Node including the derived session key extension, wherein the Mobile IP registration reply is to be authenticated by the Mobile Node using the session key.

31. The method as recited in claim 11, wherein the key information is a previously used session key shared between the Mobile Node and the Home Agent.

32. The method as recited in claim 11, wherein the key information is derived from a password associated with the Mobile Node.

33. The method as recited in claim 11, further comprising: deriving a subsequent key from the shared key.

34. The method as recited in claim 33, wherein deriving the subsequent key from the shared key is performed when a binding associated with the Mobile Node is cleared.

35. The method as recited in claim 34, wherein the binding associated with the Mobile Node is cleared upon expiration of the lifetime of the Mobile Node or de-registration of the Mobile Node.

36. In a Mobile Node, a method of registering with a Home Agent supporting Mobile IP, comprising:
sending a Mobile IP registration request from the Mobile Node to the Home Agent;
receiving a Mobile IP registration reply by the Mobile Node from the Home Agent, the Mobile IP registration reply indicating that the Mobile Node is to derive a key to be shared between the Mobile Node and the Home Agent, wherein the Mobile IP registration reply does not include the key to be shared between the Mobile Node and the Home Agent in any form; and
deriving a key to be shared between the Mobile Node and the Home Agent from key information stored at the Mobile Node, wherein deriving the key from the key information does not include decryption of the key information.

37. The method as recited in claim 36, wherein deriving a key from the key information comprises deriving the key from the key information and a CHAP challenge and response obtained from the Mobile IP registration reply.

38. The method as recited in claim 36, wherein the key information is a root key, a password, or a key shared between the Mobile Node and the Home Agent in a previous session.

39. The method as recited in claim 38, wherein the Mobile IP registration request includes a SPI, replay protection timestamp, and indicates an algorithm to be used to authenticate the Mobile IP registration request, wherein the SPI, the replay protection timestamp, and the algorithm are associated with the key information.

40. The method as recited in claim 38, wherein the Mobile IP registration reply includes a SPI, replay protection timestamp, and indicates an algorithm to be used to authenticate the Mobile IP registration reply, wherein the SPI, the replay protection timestamp, and the algorithm are associated with the key information.

41. The method as recited in claim 36, wherein the Mobile IP registration reply indicates whether the Mobile Node is to derive the shared key between the Mobile Node and the Home Agent, the method further comprising:
determining from the Mobile IP registration reply whether the Mobile Node is to derive the key;
wherein deriving a key is performed when it is determined from the Mobile IP registration reply that the Mobile Node is to derive the key.

42. The method as recited in claim 41, wherein at least one of the presence of one or more extensions in the Mobile IP registration reply and an SPI in the Mobile IP registration reply indicates that the Mobile Node is to derive the shared key between the Mobile Node and the Home Agent.

43. The method as recited in claim 36, wherein the Mobile IP registration request indicates that the Home Agent is to derive the shared key between the Mobile Node and the Home Agent from a second set of key information received by the Home Agent.

44. The method as recited in claim 43, wherein at least one of the presence of one or more extensions in the Mobile IP registration request and an SPI in the Mobile IP registration request indicates that the Home Agent is to derive the shared key between the Mobile Node and the Home Agent.

45. A computer-readable medium storing thereon computer readable instructions for generating a shared key between a Home Agent and a Mobile Node in a server adapted for authentication, authorization, and accounting, comprising:
instructions for receiving a request message from a Home Agent, the request message identifying the Mobile Node;
instructions for deriving key information from a key or password associated with the Mobile Node; and
instructions for sending a reply message to the Home Agent, the reply message including the key information associated with the Mobile Node, thereby enabling the Home Agent to derive a shared key to be shared between the Mobile Node and the Home Agent from the key information, wherein the reply message does not include the shared key in any form.

46. A server adapted for authentication, authorization, and accounting, the server being adapted for generating a shared key between a Home Agent and a Mobile Node, comprising:
a processor; and
a memory, at least one of the processor and the memory being adapted for:
receiving a request message from a Home Agent, the request message identifying the Mobile Node;
deriving key information from a key or password associated with the Mobile Node; and
sending a reply message to the Home Agent, the reply message including the key information associated with the Mobile Node, thereby enabling the Home Agent to derive a shared key to be shared between the Mobile Node and the Home Agent from the key information, wherein the reply message does not include the shared key in any form.

47. A server adapted for authentication, authorization, and accounting, the server being adapted for generating a shared key between a Home Agent and a Mobile Node, comprising:
means for receiving a request message from a Home Agent, the request message identifying the Mobile Node;
means for deriving key information from a key or password associated with the Mobile Node; and
means for sending a reply message to the Home Agent, the reply message including the key information associated with the Mobile Node, thereby enabling the Home Agent to derive a shared key to be shared between the Mobile Node and the Home Agent from the key information, wherein the reply message does not include the shared key in any form.

48. A computer-readable medium storing thereon computer-readable instructions for authenticating a Mobile Node in a Home Agent supporting Mobile IP, comprising:

instructions for receiving a Mobile IP registration request from a Mobile Node, the Mobile IP registration request identifying the Mobile Node;

instructions for sending a request message to a AAA server, the request message identifying the Mobile Node;

instructions for receiving a reply message from the AAA server, the reply message including key information associated with the Mobile Node;

instructions for deriving a key from the key information, the key being a shared key between the Mobile Node and the Home Agent, wherein deriving the key from the key information does not include decryption of the key information; and instructions for sending a Mobile IP registration reply to the Mobile Node, wherein the Mobile IP registration reply does not include the shared key in any form.

49. A Home Agent supporting Mobile IP, the Home Agent being adapted for authenticating a Mobile Node, comprising:

a processor; and a memory, at least one of the processor and the memory being adapted for:

receiving a Mobile IP registration request from a Mobile Node, the Mobile IP registration request identifying the Mobile Node;

sending a request message to a AAA server, the request message identifying the Mobile Node;

receiving a reply message from the AAA server, the reply message including key information associated with the Mobile Node;

deriving a key from the key information, the key being a shared key between the Mobile Node and the Home Agent, wherein deriving the key from the key information does not include decryption of the key information; and sending a Mobile IP registration reply to the Mobile Node, wherein the Mobile IP registration reply does not include the shared key in any form.

50. A Home Agent supporting Mobile IP and adapted for authenticating a Mobile Node, comprising:

means for receiving a Mobile IP registration request from a Mobile Node, Mobile IP the registration request identifying the Mobile Node;

means for sending a request message to a AAA server, the request message identifying the Mobile Node;

means for receiving a reply message from the AAA server, the reply message including key information associated with the Mobile Node;

means for deriving a key from the key information, the key being a shared key between the Mobile Node and the Home Agent, wherein deriving the key from the key information does not include decryption of the key information; and means for sending a Mobile IP registration reply to the Mobile Node, wherein the Mobile IP registration reply does not include the shared key in any form.

51. A computer-readable medium storing thereon computer-readable instructions for registering a Mobile Node with a Home Agent supporting Mobile IP, comprising:

instructions for sending a Mobile IP registration request to the Home Agent;

instructions for receiving a Mobile IP registration reply from the Home Agent, the Mobile IP registration reply indicating that the Mobile Node is to derive a key to be shared between the Mobile Node and the Home Agent, wherein the Mobile IP registration reply does not include the key to be shared between the Mobile Node and the Home Agent in any form; and instructions for deriving a key to be shared between the Mobile Node and the Home Agent from key information stored at the Mobile Node, wherein deriving the key from the key information does not include decryption of the key information.

52. A Mobile Node adapted for registering with a Home Agent supporting Mobile IP, comprising:

a processor; and a memory, at least one of the processor and the memory being adapted for:

sending a Mobile IP registration request to the Home Agent;

receiving a Mobile IP registration reply from the Home Agent, the Mobile IP registration reply indicating that the Mobile Node is to derive a key to be shared between the Mobile Node and the Home Agent, wherein the Mobile IP registration reply does not include the key in any form; and deriving a key to be shared between the Mobile Node and the Home Agent from key information stored at the Mobile Node, wherein deriving the key from the key information does not include decryption of the key information.

53. A Mobile Node adapted for registering with a Home Agent supporting Mobile IP, comprising:

means for sending a Mobile IP registration request to the Home Agent;

means for receiving a Mobile IP registration reply from the Home Agent, the Mobile IP registration reply indicating that the Mobile Node is to derive a key to be shared between the Mobile Node and the Home Agent, wherein the Mobile IP registration reply does not include the key in any form; and means for deriving a key to be shared between the Mobile Node and the Home Agent from key information stored at the Mobile Node, wherein deriving the key from the key information does not include decryption of the key information.

* * * * *